United States Patent [19]

Bereit

[11] 4,332,309
[45] Jun. 1, 1982

[54] APPARATUS FOR THE ATOMIZATION OF OIL IN A COMPRESSED AIR LINE

[76] Inventor: Arnold Bereit, Holbeinstrasse 68, 1000 Berlin 45, Fed. Rep. of Germany

[21] Appl. No.: 178,078

[22] Filed: Aug. 13, 1980

[30] Foreign Application Priority Data

Aug. 31, 1979 [DE] Fed. Rep. of Germany ....... 2935657

[51] Int. Cl.³ ...................... F01M 1/06; F16N 13/16
[52] U.S. Cl. .................................. 184/7 D; 184/55 H
[58] Field of Search .................. 184/55 A, 55 R, 7 D, 184/7 E, 29

[56] References Cited

U.S. PATENT DOCUMENTS

| | | | |
|---|---|---|---|
| 3,353,712 | 11/1967 | Prescott | 184/7 D X |
| 3,731,763 | 5/1973 | Thrasher et al. | 184/55 A X |
| 3,841,438 | 10/1974 | Tine et al. | 184/55 A X |
| 3,926,279 | 12/1975 | Thrasher | 184/7 D X |
| 4,105,095 | 8/1978 | Thrasher | 184/55 A |

Primary Examiner—David H. Brown
Attorney, Agent, or Firm—Parmelee, Johnson, Bollinger & Bramblett

[57] ABSTRACT

In an apparatus for the atomization of metered quantities of oil in a line (2) for supplying compressed air to compressed air units, there are provided a metering piston (10), to which pressure can be admitted via a control line (3), and two valves (18, 19, 20; 24, 25) which, when co-operating with the metering piston (10), prevent both overlubrication and underlubrication of the compressed air unit to be operated.

4 Claims, 1 Drawing Figure

U.S. Patent
Jun. 1, 1982
4,332,309
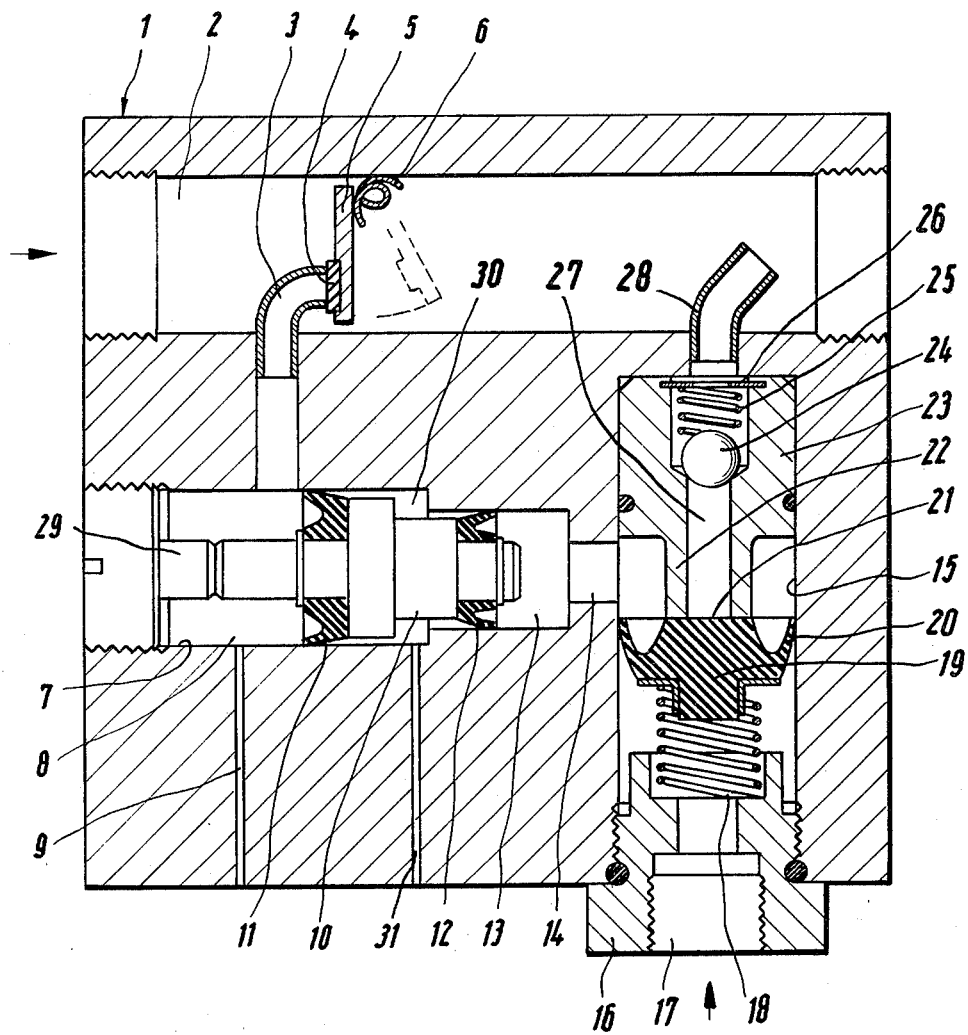

APPARATUS FOR THE ATOMIZATION OF OIL IN A COMPRESSED AIR LINE

The invention relates to an apparatus for the atomisation of oil in a line for supplying compressed air to compressed air units, in which apparatus oil, which is fed to a metering chamber via an inlet, can be delivered by a metering piston, which can be pressure-actuated, into the compressed air line, a control line serving to admit pressure to the metering piston, the end of the said control line which leads into the compressed air line being closable by a closing element which, under the effects of the air stream in the compressed air line, is moved out of its closed position into an open position, and a non-return valve, which moves into its open position when the metering piston is actuated, being fitted in the compressed air line between the metering chamber and the oil outlet.

U.S. Pat. Spec. No. 3,841,438 discloses an apparatus of the aforesaid type which has a serious disadvantage in that it is unsuitable for connection to a pressure medium source which would admit oil intermittently to the apparatus.

If the inlet of the known apparatus were connected, for example, to the intermittently operating pressure medium source of a central lubricating system, oil would be conveyed, with each shot of oil delivered from the central lubricating system, through the non-return value into the compressed air line, when air was not flowing through the compressed air line, and would collect in the said line so that a completely "supersaturated oil mist" would be produced upon subsequent operation of the compressed air unit concerned. The combination of the known apparatus and a central lubricating system would, in other words, give rise to serious environmental problems.

However, the abandonment of intermittent admission of pressure to the metering chamber then means that the danger of underlubrication arises when a compressed air unit is operated continuously for a relatively long time, because the known apparatus operates during the starting cycle of the compressed air unit. As soon as the closing element opens the control line, the metering piston is actuated by pressure via a separate air piston and is moved into a position in which it breaks the connection between the inlet and the outlet and in which it remains until air ceases to flow through the compressed air line.

It is the underlying object of the invention to provide an apparatus of the type in question which can be intermittently supplied with oil from a pressure medium source and which, after relatively long intervals for connection, prevents overlubrication of compressed air units immediately after connection. This object is achieved in accordance with the invention in that there is provided between the metering chamber and the inlet, a further valve through which pressure is admitted intermittently to the metering chamber and which comprises, apart from a sleeve which forms a second non-return valve, a valve body which, when the metering piston is not delivering pressure is pressed by a spring against an opening of a bore leading to the first non-return valve and to the outlet.

The technical advance achieved by the apparatus according to the invention is that oil can be admitted intermittently to the apparatus according to the invention from a pressure medium source without causing, after the respective compressed air units have been disconnected for a relatively long time, an accumulation of oil and the resulting signs of overlubrication which give rise to transitory and undesirable environmental problems. Apart from this technical advance the apparatus according to the invention is characterised by a particularly high degree of simplicity, not least as a result of the multiple use of the valve provided between the metering chamber and the inlet.

In the only FIGURE of the drawing reference 1 indicates a housing having a compressed air line 2 into which extends a control line 3, the end of the said control line being kept closed by the seal 4 of a closing element 5 which consists of a flap controlled by a spring 6.

The control line 3 is connected to a chamber 8, which is formed by part of a bore 7 and which can be vented via a vent line 9. Extending through the bore is a metering piston 10 having two sections 11 and 12 which are formed by sleeves and which have different diameters. The metering piston 10 forms a flexible wall section which separates the chamber 8 from a metering chamber 13 which in turn forms part of the bore 7. The metering chamber 13 is connected to part of a bore 15 via a passage 14. Screwed into the end of the bore 15 is a connecting branch 16 which forms an inlet 17 for oil which is delivered at regular intervals from a central lubricating system (not shown). A spring 18 bears against the connecting branch 16. The spring 18 supports a valve body 19 with a sleeve 20. The front 21 of the valve body bears against the front of the tubular neck 22 of an inset 23 which forms a housing for a ball 24 and a spring 25. A locking ring 26 holds the ball 24 and the spring 25 in the widened section of a bore 27 of the inset 23, the said widened section being provided for the said ball and spring.

28 designates an outlet, extending into the compressed air line 2 for the oil to be atomised in the compressed air line 2 when air is admitted to the said line.

The stroke of the metering piston 10 can be varied by an adjustable stop 29. An air intake or a vent line 31 is used to admit air to or vent the annular space 30 provided between the sections 11 and 12 of the metering piston.

The described apparatus operates as follows: oil is forced into the bore 15 through the inlet 17. The oil can pass between the wall of the bore 15 and the sleeve 20 of the valve body 19, the said sleeve forming a first non-return valve. The oil passes through the passage 14 into the metering chamber 13 and forces the metering piston 10 to the left until it reaches the position which is shown in the drawing and is defined by the stop 29. No oil can enter the bore 27, as access to the said bore 27 is closed by the front 21 of the valve body 19.

As soon as the pressure in the central lubricating system drops, pressure on the oil situated in the metering chamber 13, in the passage 14 and in that part of the bore 15 connected to the passage 14 is relieved. A return flow of oil is prevented by the sleeve 20.

When compressed air flows through the compressed air line 2, the closing element 5 moves out of the illustrated position into the position indicated by broken lines. As a result, the pressure prevailing in the compressed air line 2 is admitted to the control line 3. This pressure is also admitted to the chamber 8 and moves the metering piston 10 to the right in the drawing. As a result, the valve body 19 which, together with the spring 18, forms a control valve is moved downwards and oil passes into the bore 27. The pressure exerted on the oil by the metering piston 10 is sufficient to lift the ball 24, which combines with the spring 25 to form a non-return valve, clear from its seat, which consequently enables oil to pass through the outlet 28 into the compressed air line 2.

When the next shot of pressure oil is delivered from the central lubricating system, the metering chamber 13 is refilled with oil and the operation described can then be repeated.

I claim:

1. Apparatus for the atomization of oil in a line for supplying compressed air to compressed air units, in which apparatus oil, which is fed to a metering chamber via an inlet, can be delivered by a metering piston, which can be pressure-actuated, into the compressed air line, a control line serving to admit pressure to the metering piston, the end of the said control line which leads into the compressed air line being closable by a closing element which, under the effects of the air stream in the compressed air line, is moved out of its closed position into an open position, and a non-return valve, which moves into its open position when the metering piston is actuated, being fitted in the compressed air line between the metering chamber and the oil outlet, characterised in that there is provided between the metering chamber (13) and the inlet (17) a further valve (18, 19, 20) through which pressure is admitted intermittently to the metering chamber (13) and which comprises, in addition to a sleeve forming a second non-return valve (20), a valve body (19) which, when the metering piston (10) is not delivering pressure, is pressed by a spring (18) against an opening of a bore (27) leading to the first non-return valve (24, 25) and to the outlet (28).

2. Apparatus according to claim 1, characterised in that the metering piston (10) comprises two sections (11, 12) having different diameters, it being possible for pressure to be admitted to the section (11) with the larger diameter via the control line (3).

3. Apparatus according to claim 1 or 2, characterised in that the stroke of the metering piston (10) is variable.

4. Apparatus according to claim 1 or 2, characterised in that the metering piston (10) and the valves (18, 19, 20,; 24, 25) are arranged in two connected bores (7, 15).

* * * * *